(12) United States Patent
Pauls

(10) Patent No.: US 8,149,162 B1
(45) Date of Patent: Apr. 3, 2012

(54) METHODS AND APPARATUS FOR N-LATERATION WITH NOISY DATA MEASUREMENTS

(75) Inventor: Richard J. Pauls, Lafayette, NJ (US)

(73) Assignee: Exelis Inc., McLean, VA (US)

( * ) Notice: Subject to any disclaimer, the term of this patent is extended or adjusted under 35 U.S.C. 154(b) by 234 days.

(21) Appl. No.: 12/577,447

(22) Filed: Oct. 12, 2009

(51) Int. Cl.
*G01S 3/02* (2006.01)

(52) U.S. Cl. ........................................ 342/351

(58) Field of Classification Search .......... 342/450–464, 342/357.2–357.78
See application file for complete search history.

(56) References Cited

U.S. PATENT DOCUMENTS 7,138,946 B2 * 11/2006 Tamaki et al. ................ 342/463
7,848,766 B2 * 12/2010 Ogino et al. ............... 455/456.5

* cited by examiner

*Primary Examiner* — Thomas Tarcza
*Assistant Examiner* — Nga X Nguyen
(74) *Attorney, Agent, or Firm* — Edell, Shapiro & Finnan, LLC

(57) ABSTRACT

A technique for determining the position of a device involves generating a set of N measurements from signals transmitted by a respective set of N references devices, where the N measurements are suitable for determining a position of the device using N-lateration. Respective reliability metrics are generated for the N measurements based on information about uncertainty of individual measurements. An N-lateration computation is used to iteratively refine an estimate of the position of the device. Each iteration includes adjusting the estimate of the position of the device based on a least squares function that minimizes a sum of squares of errors between the N measurements and distances between the estimate of the position of the device and the N reference sources. The least squares function is weighted in accordance with the reliability metrics for the N measurements.

29 Claims, 10 Drawing Sheets

US 8,149,162 B1

METHODS AND APPARATUS FOR N-LATERATION WITH NOISY DATA MEASUREMENTS

BACKGROUND

State-of-the-art position determining systems need to provide rapid and accurate three-dimensional position determination of mobile, handheld, or portable devices. For example, the FCC has mandated that when a mobile telephone user makes an emergency call in the U.S., the service provider must be able to locate the user to within 50 meters within 30 seconds. This service is known as enhanced 911 (E911).

Among techniques employed to determine the position of a mobile device is the reception at the mobile device of multiple timing signals respectively transmitted from multiple transmitters at different, known locations. For example, the timing signals can be global positioning system (GPS) signals transmitted by satellites or signals transmitted from terrestrial sources such as cellular telephone towers. By determining the range or pseudo-range to each transmitter from the arrival time of the timing signals, the mobile device can compute its position using trilateration or, more generally, N-lateration, where N is the number of timing signal sources, which can be three or more.

One shortcoming of current N-lateration algorithms is the inability to adequately account for the relative accuracy of individual timing signals within the computations performed to determine position. In some circumstances, ranging or pseudoranging signals may be noisy due to atmospheric conditions, interference, or multipath effects, and such factors may impact certain signals more than others. Accordingly, there remains a need for improved N-lateration schemes that can accurately determine the position of a device even with noisy field data.

SUMMARY

A technique for determining the position of a device involves generating a set of N measurements from signals transmitted by a respective set of N references devices, where the N measurements are suitable for determining a position of the device using N-lateration. Respective reliability metrics are generated for the N measurements based on information about uncertainty of individual measurements. An N-lateration computation is used to iteratively refine an estimate of the position of the device. Each iteration includes adjusting the estimate of the position of the device based on a least squares function that minimizes a sum of squares of errors between the N measurements and distances between the estimate of the position of the device and the N reference sources. The least squares function is weighted in accordance with the reliability metrics for the N measurements.

The least squares function can be implemented to perform a steepest decent method, Newton's iterative method, or a combination of the two. In the case of the steepest decent approach, the least squares function comprises a gradient operator comprising a vector of partial derivatives of the sum of squares of errors. In the case Newton's iterative method, an N×1 error vector is constructed whose N components are the respective errors between the N measurements and distances between the estimate of the position of the device and the N reference sources. The least squares function involves an N×N matrix computed from the Jacobian matrix of the error vector. The N×N matrix is computed using a weighting matrix that respectively weights the N components of the error vector in accordance with the reliability metrics for the N measurements. By weighting mixed partial derivatives less than self partial derivatives of the Jacobian matrix, the N×N matrix can be biased towards steepest decent. The reliability metrics are adapted from one set of N measurements to the next based on information about uncertainty of individual measurements.

As described herein, the N-lateration techniques of the present invention are readily extendable to more than three sensors (i.e., sources of measurements) and can flexibility accommodate a changing number of sensors in real time. The weighting of the sensor input is based on a reliability estimate of the individual sensor data, which improves robustness to sensor data signal quality degradation in an error prone or hostile environment. The adaptive weighting and combining of sensor data is based on metrics of real time sensor reliability in the field.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
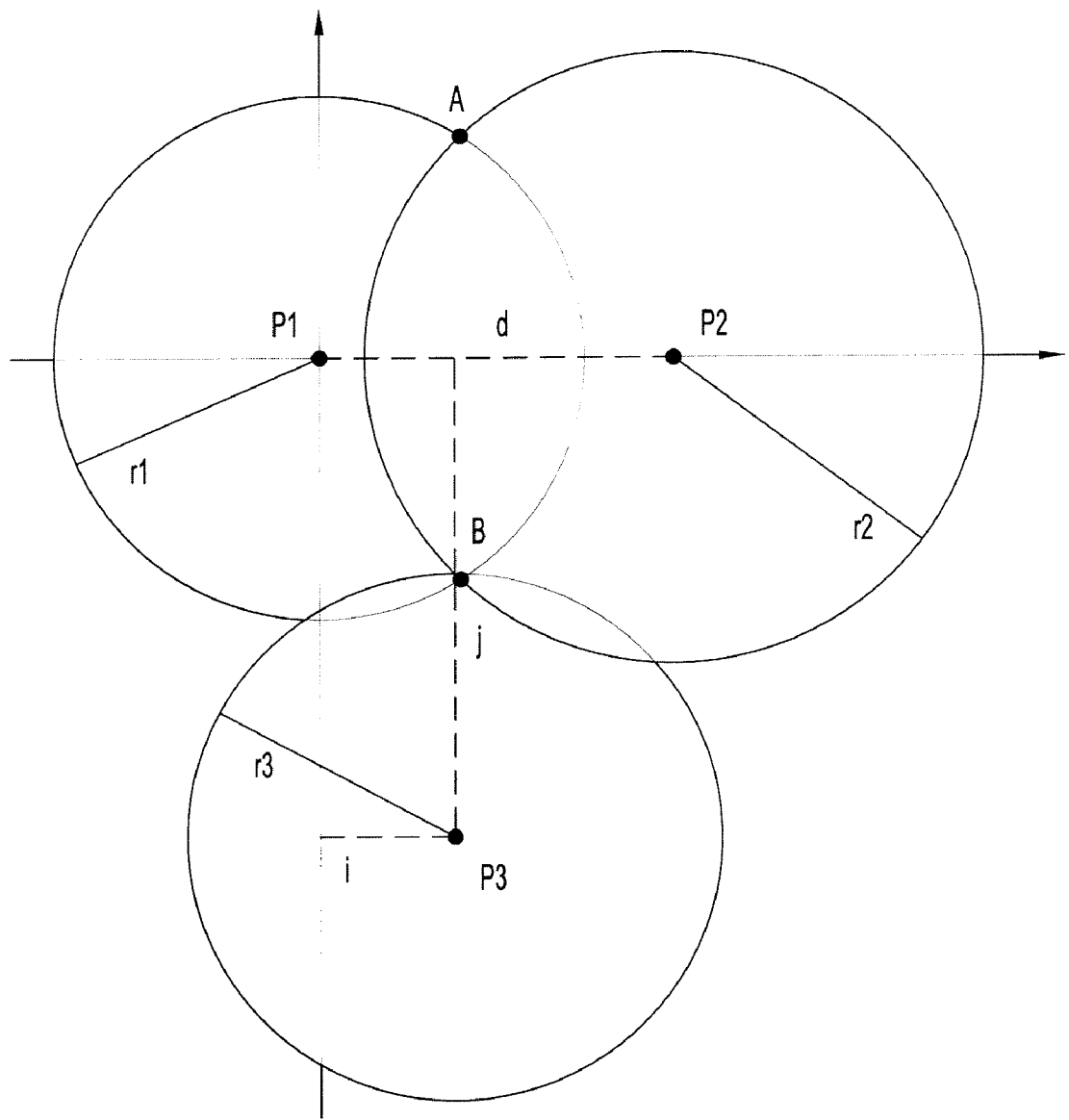
FIG. 1 is a two-dimensional graph illustrating the trilateration concept in which a solution point is determined from the intersection of three range spheres.

A mathematical derivation for the solution of a three-dimensional trilateration problem can be found by taking the formulas for three spheres and setting them equal to each other. To do this, three constraints must be applied to the centers of these spheres in the context of a three-dimensional (x, y, z) Cartesian coordinate system: all three must be on the z=0 plane, one must be at the origin, and one other must be on the x-axis. It is, however, possible to translate any set of three points to comply with these constraints, find the solution point, and then reverse the translation to find the solution point in the original coordinate system. This setup is shown in FIG. 1, and the derivation is as follows.

Starting with the equations of three spheres, $$r_1^2 = x^2 + y^2 + z^2$$

$$r_2^2 = (x-d)^2 + y^2 + z^2,$$

$$r_3^2 = (x-i)^2 + (y-j)^2 + z^2 \quad (1)$$

the second expression is subtracted from the first and solve for x:

$$x = \frac{r_1^2 - r_2^2 + d^2}{2d} \quad (2)$$

Substituting this expression for x back into the formula for the first and third spheres yields:

$$y = \frac{r_1^2 - r_3^2 + i^2 + j^2}{2j} - \frac{i}{j}x \quad (3)$$

and, $$z = \sqrt{r_1^2 - x^2 - y^2} \quad (4)$$

The solution to all three points x, y, and z has now been obtained. Because z is expressed as a square root, it is possible for there to be zero, one or two solutions to the problem. Further, the subtraction of one of the sphere equations from the other as performed in the first step above requires that the values x, y, and z in these equations equal each other and can hence be canceled. This implies the existence of a solution point. If the spheres do not overlap, there will be no real physical solution, which leads to the imaginary result.

As shown in FIG. 1, the trilateration computation attempts to determine the location of intersection point B relative to the reference points P1, P2, and P3 on a two-dimensional plane. Measuring a radius r1 (e.g., a range measurement) from reference point P1 narrows the solution down to a circle. Next, measuring the radius r2 from the second reference point P2 narrows the solution down to two points, A and B. A third radius measurement r3 from the third reference point P3 yields coordinates of the solution at point B. A fourth measurement could also be made to reduce error.

Figure 2:
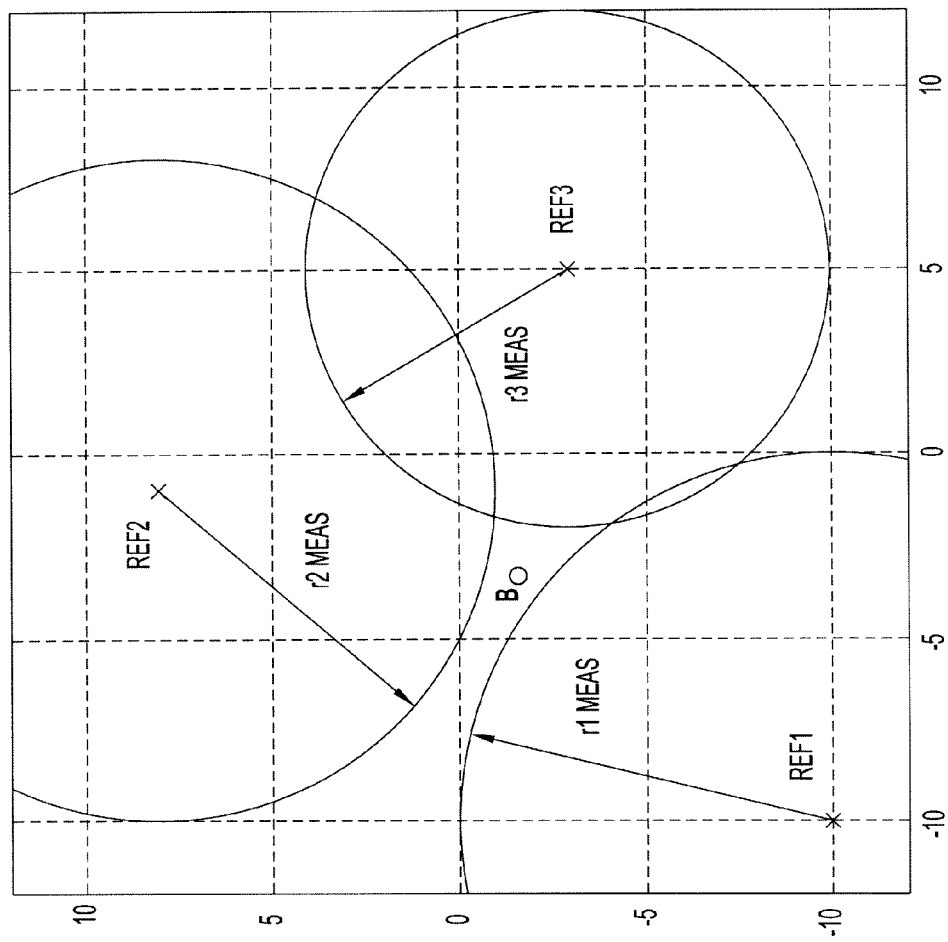
FIG. 2 is a two-dimensional graph illustrating the effect of measurement inaccuracies on trilateration in which the three range spheres do not intersect at a point.

If the three reference points and the target solution point all lie in a common plane, such as might be the case in a parking lot or field, then it is known that the actual z component of the target solution point is zero. If the z value calculated from equation (4) turns out to be anything other than zero, it can be concluded that some of the measured position (positions of the sources) and range data must have contained errors. Furthermore, the magnitude of this component can be used as a figure of merit to help refine estimates of these measured values. An example of this is shown in FIG. 2. This example shows three reference nodes Ref1, Ref2, Ref3 respectively located at coordinates (−10, −10), (−1, 8), and (5, −3). The measured radii (ranges) from the reference nodes Ref1, Ref2, Ref3 are 10, 9, and 7, respectively. There is no real solution for the target position B, because there is no point at which all three radii overlap. Thus, in this case, basic trilateration as described above will give an imaginary result for the z value of the target position.

Figure 3:
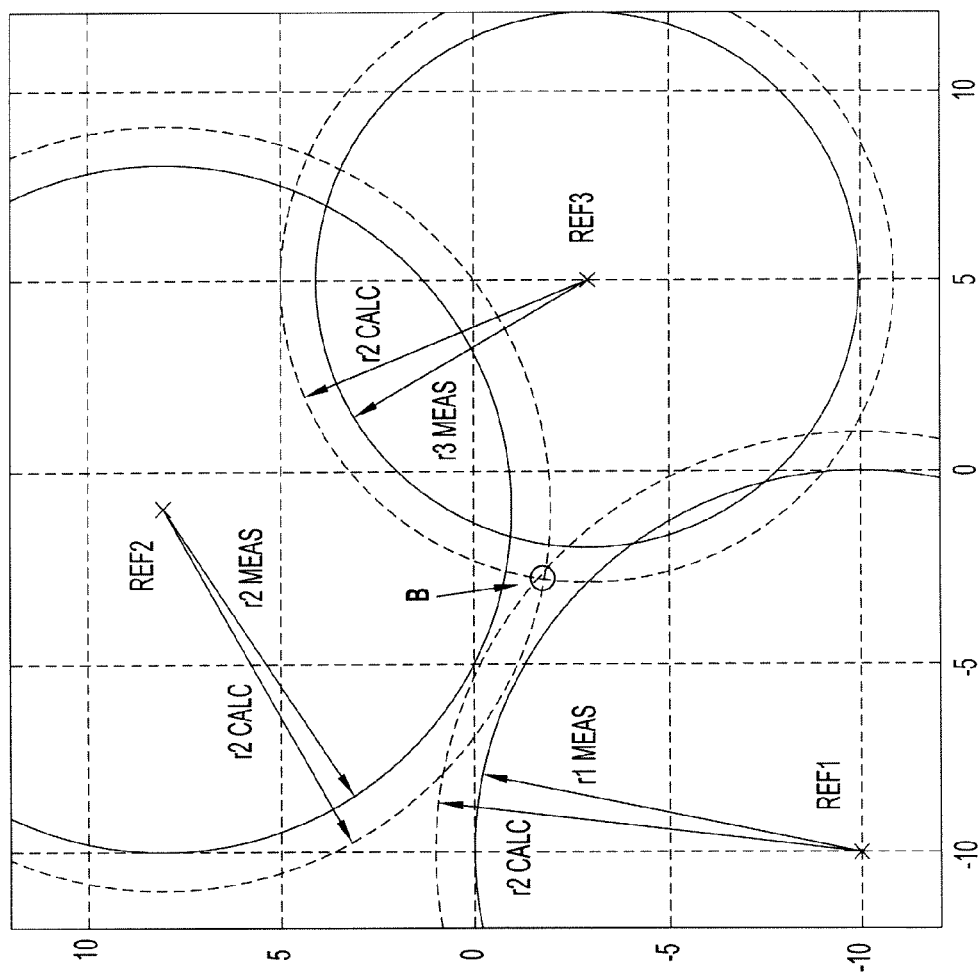
FIG. 3 is a two-dimensional graph illustrating a technique for estimating the position of a solution point with trilateration by adjusting the radii of the range spheres.

For purpose of the description herein, it will be assumed that the positions of the reference nodes are accurately known and that any data errors are contained in the range measurements only. When a set of range measurements are collected and the calculated z value turns out to be nonzero, a slight modification to each of the three range estimates from the initial measured values is sought until a solution is found for which z=0. This approach is illustrated in FIG. 3, which shows the original range measurements ($r1_{meas}$, $r2_{meas}$, $r3_{meas}$) and the modified measurements ($r1_{calc}$, $r2_{calc}$, $r3_{calc}$). To compute these modified values iterative methods can be employed, as described below.

The first method is a "guided walk" scheme. In this approach, the (x, y, z) coordinates are calculated from the measured range data using equations (2) to (4) above, and the value of z is recorded. The measured range values are used as the initial estimates for r1, r2, and r3, and the initial estimate of the target position is taken to be (x, y, 0). The value of r1 is increased by a fixed step size, h, and recomputed. If the value of z decreases, this change is considered a "step in the right direction," and the estimate r1 is increased by h. On the other hand, if the value of z increases, then r1 is reduced by h to step backwards. This process is repeated for each of the other two radii in turn. This whole process is repeated in a loop until the value of z is driven below some chosen threshold. If, during the iteration, the new value of z is greater than the old value in both directions, then the step size h is halved so as to allow finer resolution and convergence on the solution point.

Figure 4:
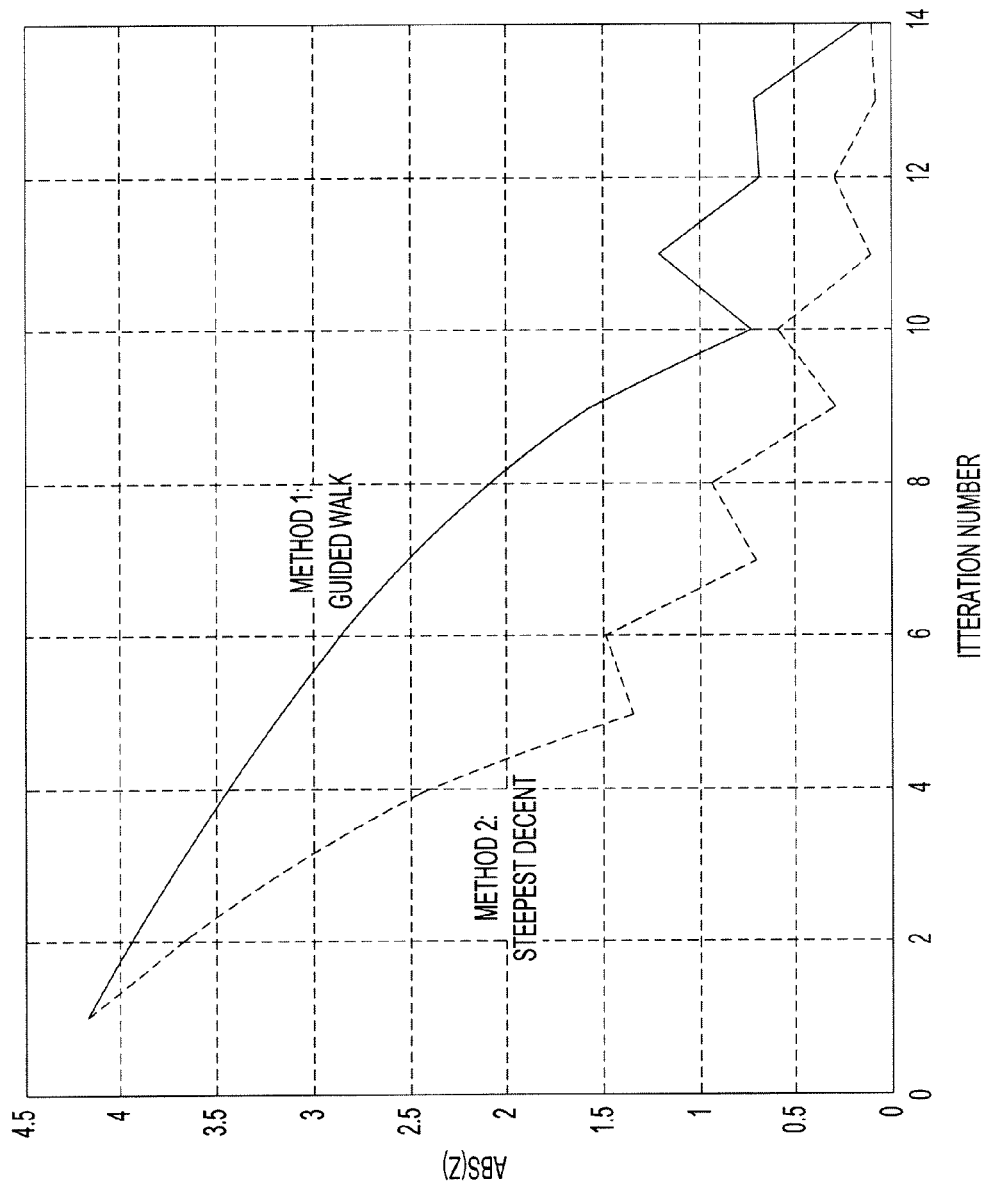
FIG. 4 is a graph plotting the absolute value of the z coordinate of trial position solutions over several iterations for the guided walk and steepest decent methods for minimizing the z coordinate.

The upper curve in the graph of FIG. 4 shows the absolute value of z as a function of the number of iterations for this method. This simple method is well behaved and converges dependably for any input data given enough iterations, but the number of computations required for each step is relatively large. It is described here primarily as an example to illustrate how making small changes to the estimated radii under the guidance of a quality metric can get one closer to a useful result.

According to another approach called steepest decent, a more directed path toward z=0 is taken by forming the equation for the magnitude of z as a function of r1, r2, and r3, and finding its local minimum. For simplification, $z^2$ is used instead of the magnitude of z. Combining equations (2) to (4) yields:

$$z^2(r1, r2, r3) = \quad (5)$$

$$r_1^2 - \left[\frac{r_1^2 - r_2^2 + d^2}{2d}\right]^2 - \left[\frac{r_1^2 - r_3^2 + n^2 + m^2}{2m} - \left(\frac{n}{m}\right)\frac{-r_1^2 - r_2^2 + d^2}{2d}\right]^2$$

The goal is to find the local minimum of $z^2$ in the region near the starting point given by the measured values r1, r2, and r3. Since this equation is non-linear, it is difficult to solve in closed form, so an iterative approach is again taken using the method of steepest decent. This method works by employing the fact that a multivariable function decreases most rapidly in the direction of its negative gradient. In vector notation:

$$\begin{bmatrix} r1 \\ r2 \\ r3 \end{bmatrix}_{n+1} = \begin{bmatrix} r1 \\ r2 \\ r3 \end{bmatrix}_n - \gamma \nabla z(r1, r2, r3)_n, \quad n \geq 0 \quad (6)$$

where the gradient operator is given by $$\nabla z = \begin{bmatrix} \frac{\partial z}{\partial r_1} \\ \frac{\partial z}{\partial r_2} \\ \frac{\partial z}{\partial r_3} \end{bmatrix} \quad (7)$$

which shows how to get the $n+1^{st}$ set of radii estimates from the $n^{th}$ set. The results of this method applied to the same setup used in the previous example are shown in the lower curve in FIG. 4. As expected, this method converges faster than the first method; however, there is a significant drawback to this approach as well. The difficulty is in the choosing of the step size $\gamma$ in equation (6). If a value of $\gamma$ is chosen that is well suited to the function at hand, the convergence will be fast and well behaved, but if the value is too large, the iteration will become unstable and diverge or oscillate. Likewise, if the value is too small, then an inordinate number of steps will be required to converge. In principle, the value of $\gamma$ can be adjusted after each iteration, but a formula to do so is difficult to design.

Both of the methods above rely on starting with an initial estimate of target position derived from the three measured radii and then modifying these radii slightly in order to get the "closest" solution for which z=0. However, in general, unless some special information is available about peculiarities of the measurement distribution, mean square error (MSE) is the most natural candidate for a closeness metric. For any point in space (x, y, z) a line can be drawn to each of the three reference nodes. If the length of these lines is indicated by $d_1$, $d_2$, and $d_3$, respectively, and the measured radii are indicated by $r_1$, $r_2$, and $r_3$, respectively, then the sum of squared errors for this point is:

$$F(x,y,z)=(d_1-r_1)^2+(d_3-r_2)^2+(d_3-r_3)^2 \quad (8)$$

In this case, the goal is to find the point (x, y, z) that minimizes equation (8), i.e., the least squares fit. At this point, the differences between the estimates of the radii and their measured values is minimized in the mean square sense. Two iterative methods will be described to find this minimum: steepest decent and Newton's iterative method.

The steepest decent applied to the least squares approach is similar to the steepest decent technique described above, but instead of minimizing the z value of the result, the sum of the squares of the errors in the radii estimates is minimized. For illustration purposes, start with any point in space, (x, y, z) as an initial estimate of target position. The equations for the distances from the estimate point to each of the reference points can be expressed as:

$$(x_1-x_T)^2+(y_1-y_T)^2+(z_1-z_T)^2=d_1^2$$

$$(x_2-x_T)^2+(y_2-y_T)^2+(z_2-z_T)^2=d_2^2$$

$$(x_3-x_T)^2+(y_3-y_T)^2+(z_3-z_T)^2=d_3^2 \quad (9)$$

Where $(x_i, y_i)$ are the coordinates of reference point i, and $(x_T, y_T)$ are the coordinates of the estimated target position. Substituting equation (9) into equation (8) yields:

$$F(x, y, z) = \sum_{i=1}^{3} (d_i - r_i)^2 = \sum f_i(x, y, z)^2, \quad (10)$$

Where $$f_i(x,y,z)=d_i-r_i=\sqrt{(x_i-x_T)^2+(y_i-y_T)+(z_i-z_T)^2}-r_i \quad (11)$$

To minimize the sum of squares, the same formula given by equations (6) and (7) is used, but acting on the function F(x,y,z).

$$\begin{bmatrix} x \\ y \\ z \end{bmatrix}_{n+1} = \begin{bmatrix} x \\ y \\ z \end{bmatrix}_n - \gamma \nabla F(x, y, z)_n, \quad n \geq 0 \quad (12)$$

Where $$\nabla F = \begin{bmatrix} \frac{\partial F}{\partial x} \\ \frac{\partial F}{\partial y} \\ \frac{\partial F}{\partial z} \end{bmatrix} = \begin{bmatrix} \sum f_i \frac{x_i-x_T}{\sqrt{(x_i-x_T)^2+(y_i-y_T)^2+(z_i-z_T)^2}} \\ \sum f_i \frac{y_i-y_T}{\sqrt{(x_i-x_T)^2+(y_i-y_T)^2+(z_i-z_T)^2}} \\ \sum f_i \frac{z_i-z_T}{\sqrt{(x_i-x_T)^2+(y_i-y_T)^2+(z_i-z_T)^2}} \end{bmatrix} \quad (13)$$

Figure 5:
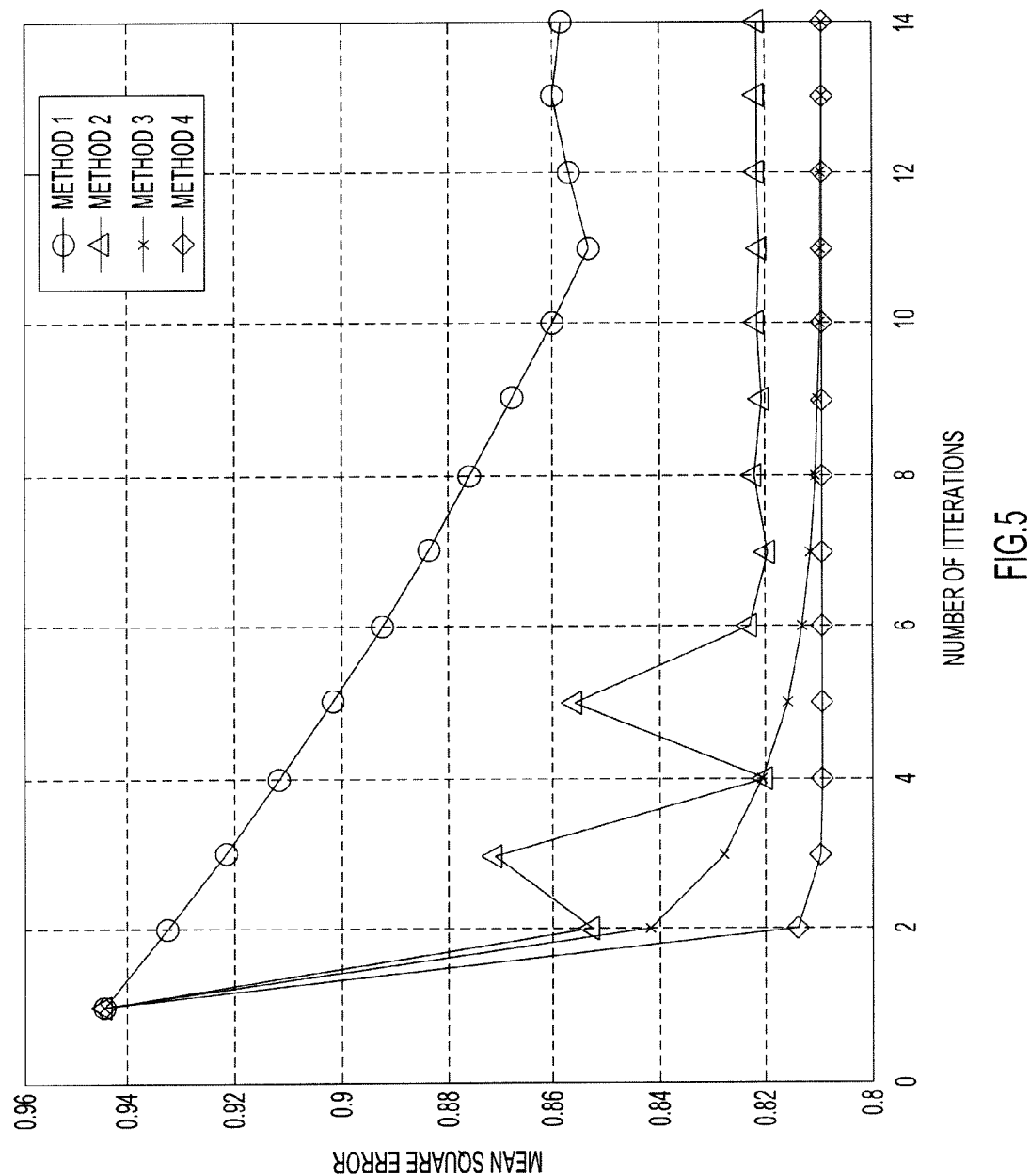
FIG. 5 is a graph plotting the mean square error as a function of the number of iterations for four different trilateration methods.

If the solution is again restricted to points in the x-y plane, z=0 can be set for all nodes, yielding a simpler set of only two equations. The results of this method are shown in FIG. 5 by the curve labeled "Method 3." For comparison, the MSEs achieved by the "guided walk" approach to minimizing z and the steepest descent approach applied to minimizing z described above are respectively shown as "Method 1" and "Method 2" in FIG. 5. As can been seen from the graph, the rate of convergence for the steepest decent applied to MSE is remarkably better than either of the minimization-of-z approaches described previously.

Newton's method is an iterative approach for finding the roots of equations, and hence can be used to find the local maxima and minima of a function as well by first taking the derivative of the function and then solving for the roots of this derivative. Using this approach yields:

$$\begin{bmatrix} x \\ y \\ z \end{bmatrix}_{n+1} = \begin{bmatrix} x \\ y \\ z \end{bmatrix}_n - [HF(x, y, z)_n]^{-1} \nabla F(x, y, z)_n \quad (14)$$

Where H is the Hessian matrix of second order partial derivatives.

$$H(F) = \begin{bmatrix} \frac{\partial^2 F}{\partial x^2} & \frac{\partial^2 F}{\partial x \partial y} & \frac{\partial^2 F}{\partial x \partial z} \\ \frac{\partial^2 F}{\partial y \partial x} & \frac{\partial^2 F}{\partial y^2} & \frac{\partial^2 F}{\partial y \partial z} \\ \frac{\partial^2 F}{\partial z \partial x} & \frac{\partial^2 F}{\partial z \partial y} & \frac{\partial^2 F}{\partial z^2} \end{bmatrix} \quad (15)$$

By comparing equation (14) with equations (6) and (12), it can be seen that the inverse Hessian essentially operates as a complicated version of the step size $\gamma$, which in fact it is: a step size that depends on the interactions of x, y, and z as captured in their second order mixed partial derivatives.

Noting that the Hessian matrix is equal to the Jacobian of the gradient, an alternative representation can be written as follows:

$$\begin{bmatrix} x \\ y \\ z \end{bmatrix}_{n+1} = \begin{bmatrix} x \\ y \\ z \end{bmatrix}_n - [J^T J]^{-1} J^T \vec{f_n} \quad (16)$$

Where $$J = \begin{bmatrix} \frac{\partial f_1}{\partial x} & \frac{\partial f_1}{\partial y} & \frac{\partial f_1}{\partial z} \\ \frac{\partial f_2}{\partial x} & \frac{\partial f_2}{\partial y} & \frac{\partial f_2}{\partial z} \\ \frac{\partial f_3}{\partial x} & \frac{\partial f_3}{\partial y} & \frac{\partial f_3}{\partial z} \end{bmatrix} \quad (17)$$

And F(x,y,z) is arranged into a vectorized version of its constituent functions, $$\vec{f} = \begin{bmatrix} f_1 \\ f_2 \\ f_3 \end{bmatrix} \quad (18)$$

Substituting in the actual functions given by equation (11) yields:

$$J^T J = \begin{bmatrix} \sum f_i \frac{(x_i - x_T)^2}{D_i^2} & \sum f_i \frac{(x_i - x_T)(y_i - y_T)}{D_i^2} & \sum f_i \frac{(x_i - x_T)(z_i - z_T)}{D_i^2} \\ \sum f_i \frac{(x_i - x_T)(y_i - y_T)}{D_i^2} & \sum f_i \frac{(y_i - y_T)^2}{D_i^2} & \sum f_i \frac{(y_i - y_T)(z_i - z_T)}{D_i^2} \\ \sum f_i \frac{(x_i - x_T)(z_i - z_T)}{D_i^2} & \sum f_i \frac{(y_i - y_T)(z_i - z_T)}{D_i^2} & \sum f_i \frac{(z_i - z_T)^2}{D_i^2} \end{bmatrix} \quad (19)$$

and, $$J^T \vec{f} = \begin{bmatrix} \sum f_i \frac{-(x_i - x_T) f_i}{D_i^2} \\ \sum f_i \frac{-(y_i - y_T) f_i}{D_i^2} \\ \sum f_i \frac{-(z_i - z_T) f_i}{D_i^2} \end{bmatrix} \quad (20)$$

where, $$D_i^2 = (x_i - x_T)^2 + (y_i - y_T)^2 + (z_i - z_T)^2 \quad (21)$$

While these equations appear complicated, the explicit solutions in this context are actually fairly straightforward, and if restricted to the two-dimensional case, these reduce to a 2-by-2 set of equations for which the matrix inverse is trivial. The performance of this approach is shown in FIG. 5 as "Method 4" along with the previous approaches for comparison. From this graph, it is evident that Newton's iterative method converges much more quickly than the other methods. For this particular example, the resulting MSE is very near its final value after only two iterations. This method also does not suffer from the drawback of having to choose and update the optimum step size as in the steepest descent approach. In practice, this type of iteration works best if a small amount of the gradient approach is blended in to bias the result towards that of steepest descent. This can easily be accomplished by augmenting the $J^T J$ matrix with a constant diagonal matrix, which causes the algorithm to consider the mixed partials a little less than the self partials. Thus, more precisely, the Method 4 results shown in FIG. 5 are from the Newton iteration modified with a slight bias toward Steepest Descent applied to MSE. Comparing the performance of four methods, FIG. 5 demonstrates that the best approach is a combination of Newton's iteration and steepest descent applied to minimizing the mean square error in the measured reference node distances.

A significant benefit to the least squares approach is that the extension to more than three reference nodes is straightforward. Each additional reference simply adds another row to the Jacobian matrix J, and the column vector f. The matrix product $J^T J$ will always be square with a dimension of two for the two-dimensional case or three for the three-dimensional case. It is possible, however, that the particular locations of the N references may result in a matrix that is ill conditioned (singular or nearly singular). In this case, the inverse cannot be computed in the traditional manner and an alternative approach is needed such as singular value decomposition (SVD). Another possibility is to remove some of the references from the computation if they can be identified as being of questionable reliability (outliers).

Once the N-lateration algorithm is set up using the least squares model, the computation can be modified to apply weights to each of the components of the error vector in order to consider some of the error vector components more than others based on the reliability of the individual measurements associated with the error vector components. This weighted least squares approach can be used to incorporate known information about the reliability of individual measurements so that those that are considered highly reliable will influence the MSE more than those that are considered less reliable. Since real world data is likely to be frequently corrupted by noise, the ability to bias the algorithm in this manner is considered highly desirable.

One metric of input data reliability is the sample variance. For range and position measurements, this quantity may be obtained from the output of the Kalman filter operating on the raw measurements before they are applied to the N-lateration module. The accuracy of the raw measurements supplied to the filter may be estimated from information such as signal-to-noise ratio or the like. The higher the variance, the less reliably the data point. The following equation shows how the Jacobian method can be modified to account for this.

$$\begin{bmatrix} x \\ y \\ z \end{bmatrix}_{n+1} = \begin{bmatrix} x \\ y \\ z \end{bmatrix}_n - [J^T W J]^{-1} J^T W \vec{f}_n \quad (22)$$

Where $$W = \begin{bmatrix} \frac{1}{\sigma_1^2} & 0 & 0 \\ 0 & \frac{1}{\sigma_2^2} & 0 \\ 0 & 0 & \frac{1}{\sigma_3^2} \end{bmatrix} \quad (23)$$

In this case, the variance $\sigma_i^2$ (or more precisely its reciprocal) is intended to serve as a general figure of merit or figure of confidence for both the position and range measurements for reference node i. This can be accomplished, for example, by adding the respective variances of the individual components as a first approximation. This is suboptimal of course, but is illustrative of how such a data quality metric can be included. It will be appreciated that the invention is not limited to the use of variances of individual components, and other reliability metrics or figures of merit can be used for the diagonal elements of the weighting matrix W to allow the least squares algorithm to vary the influence of each constituent signal on the position determination.

These metrics of sensor data reliability (whether variances or other metrics) can be continually updated in a recursive manner based on measured characteristics of the data such as mean, variance, and other statistical deviations from predicted values as might be determined by operating a predictive filter or estimation algorithm on the incoming data streams (e.g., such as a Kalman filter, other linear predictive filtering, or the like). Further, screening tests can be employed to detect outliers indicating data corruption or other anomalies that would indicate a reason to discount the information from a particular sensor at a particular time. For example, a sudden jump in a range measurement from a particular reference source or node may indicate corruption from a multipath signal. Any of these methods can be used to produce confidence indicators for the individual data streams from each sensor, and these indicators can in turn be used in an adaptive algorithm that continually tunes the combinational weights of the weighting matrix W in an optimal manner so as to maximize overall confidence in the final result. This process can be mechanized as a separate algorithm running in the background that updates the weighting matrix W in an adaptive manner so that the final result is optimized.

Once the position estimate of the target has been computed, it would be desirable to report this position along with some representation of confidence in the accuracy of this value. One form of such representation is the Circular Error Probable (CEP). This value is defined as the radius from the estimate within which the actual result can be expected to fall 50% of the time. The actual computation of CEP for the N-lateration problem is beyond the scope of this description. However, the standard deviation of the target position estimate can be used as a rough estimate of CEP. This value is computed as the square root of the MSE, which is in essence a positional variance.

Figure 6:
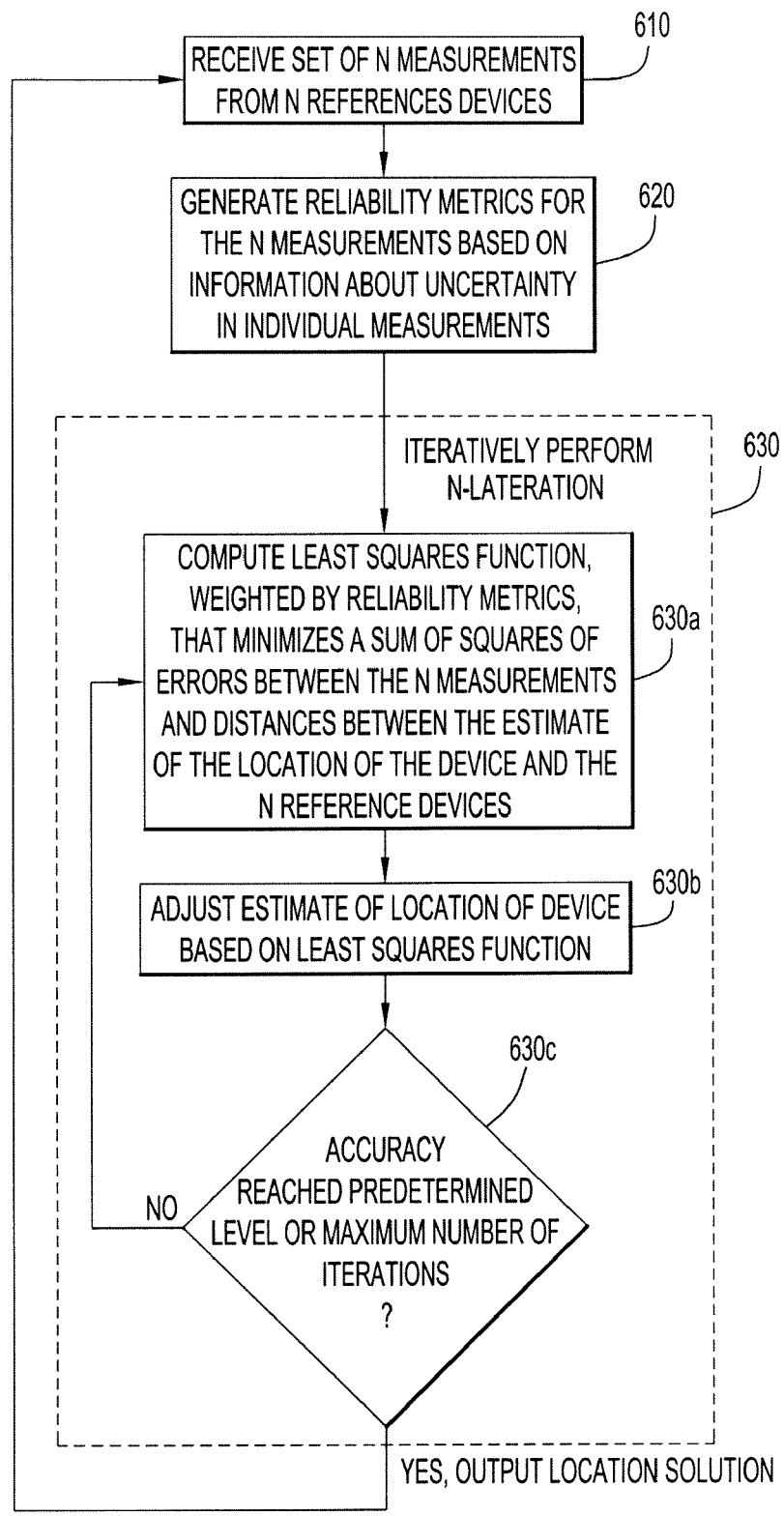
FIG. 6 is a flow diagram summarizing the operations performed to carry out N-lateration that accounts for individual measurement reliability.

The methodology described above is summarized in the flow diagram of FIG. 6. Specifically, in operation 610, a set of N measurements are generated from signals received from a respective set of N reference sources (N>2), where the N measurements are suitable for determining the position of a device using N-lateration. For example, the N measurements can be derived from timing signals that can be processed to determine ranges or pseudoranges between a mobile device and the reference sources.

In operation 620, respective reliability metrics are generated for the N measurements based on information about uncertainty in individual measurements. As previously explained, the reliability metric can be a measure of variability such as variance or standard deviation that reflect uncertainty in the range measurement and/or the position of the reference source. This information can be derived from information about the measurement itself (e.g., signal-to-noise ratio) and/or from accuracy or uncertainty estimates generated by filtering the measurements (e.g., using a Kalman filter or the like). In the case where the N-lateration computation is performed via a matrix operator, the reliability metrics can be represented as the diagonal components of a weighting matrix W, as shown in equations (22) and (23) above.

In operation 630, an N-lateration computation is iteratively performed to refine an estimate of the position of the device. In particular, in operation 630a, a least squares function is computed that minimizes the sum of squares of errors between the N measurements and distances between the estimate of the position of the device and the N reference sources. The least squares function is weighted in accordance with the reliability metrics for the N measurements, such that the more reliable measurements among the N measurements are given greater consideration than the less reliable measurements within the N-lateration computation. In operation 630b, the estimate of the position of the device is adjusted based on the least squares function.

The steepest decent applied to MSE and Newton's iterative method applied to MSE, as described above, are two examples of least squares functions that can be used in operation 630 to iteratively adjust and refine the estimate of the position of the device. In the case of the steepest decent method, the least squares function comprises a gradient operator comprising an Nx1 vector of partial derivatives of the sum of squares of errors and an iteration step size (see equations (12) and (13) above). In the case of Newton's iterative method, the step size of the least squares function can be represented by an inverse Hessian function based on a Hessian matrix of second order partial derivates of the sum of squares of errors (see equations (14) and (15) above). Equivalently, the least squares function for Newton's iterative method can be expressed as a Jacobian function that operates on an Nx1 error vector whose N elements are the respective errors between the N measurements and distances between the estimate of the position of the device and the N reference sources (see equation (16) above). In this case, the reliability metrics are represented in a weighting matrix W that is incorporated into the least squares function such that N elements of the error vector are respectively weighted in accordance with the reliability metrics for the N measurements (see equation (22) above).

In operation 630c, an accuracy or error metric is used to determine whether the accuracy has reached a predetermined level. If so, or if a maximum number of iterations has been performed without reaching the desired accuracy level, no further iterations of the N-lateration computation are performed, and the last computed solution is output as the position of the device.

Upon receipt of successive sets of measurements, operations 620 and 630 are repeated to update the position of the device. Thus, for example, the reliability metrics (e.g., the weighting matrix W) is adaptively adjusted from one set of measurements to the next based at least in part on the reliability of the current measurements. In the case of Newton's iterative method, variations in the number of measurements N used to compute the position of the device can be accommodated by adjusting the size of the Jacobian operator and the error vector accordingly, as described above.

Figure 7:
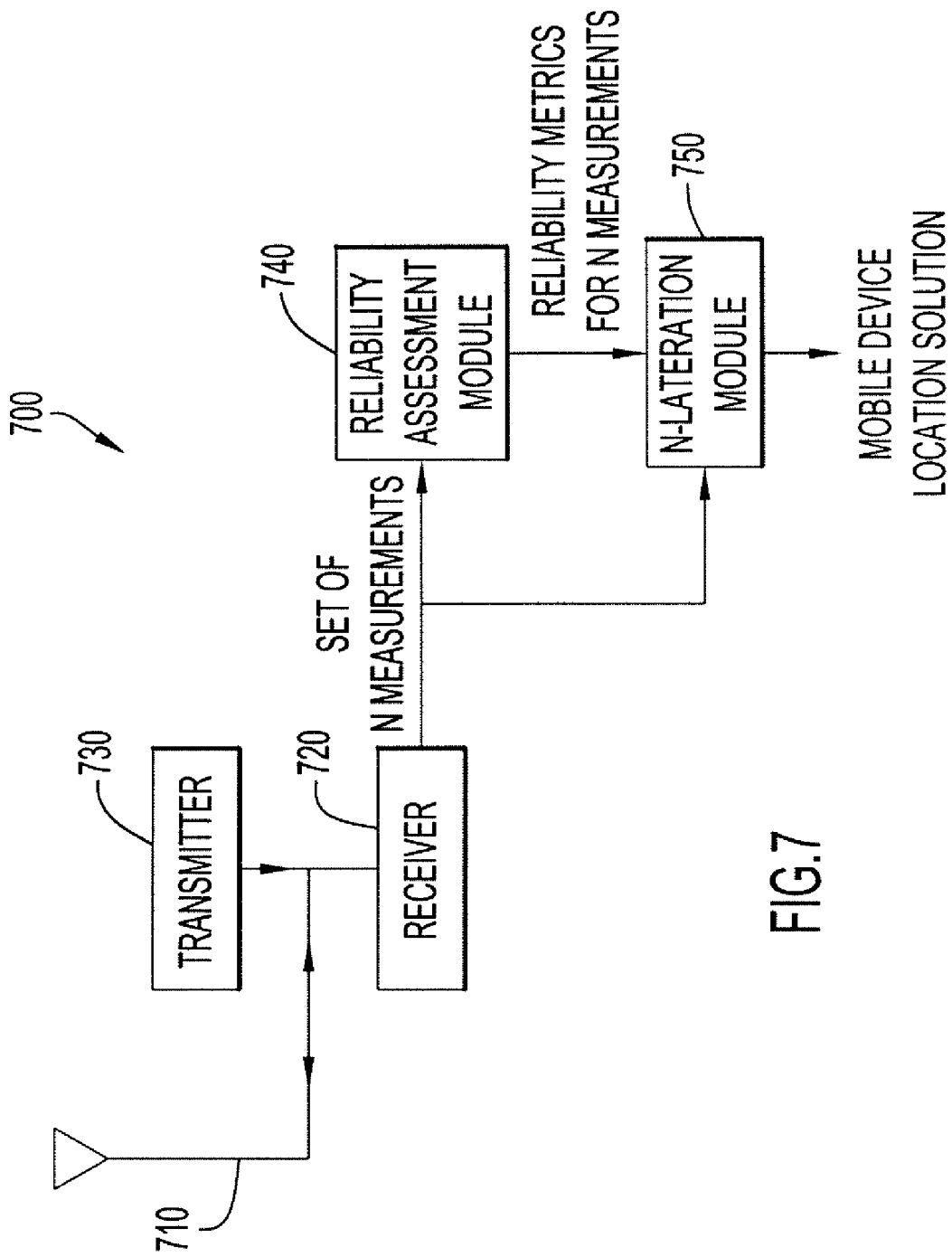
FIG. 7 is a block diagram illustrating an apparatus configured to determine the position of a mobile device.

FIG. 7 is a block diagram illustrating an apparatus 700 configured to determine the position of a mobile device. Optionally, the apparatus can be the mobile device itself or a portion of the mobile device (e.g., a mobile radio, a mobile telephone, a mobile GPS device, etc.). According to another option, the apparatus can be a separate device (e.g., a base station or processing hub of a cellular telephone system).

Apparatus 700 includes an antenna 710 and a receiver 720 for receiving signals for determining the position of a mobile device. Where the mobile device is or includes the position-determining apparatus 700, receiver 720 can directly receive the signals from the N reference sources or nodes. For example, receiver 720 can receive a set of timing signals that can be used to compute ranges or pseudoranges between the mobile device and the respective reference sources (e.g., base stations, GPS satellites, other transmitters whose locations are known, etc.). Where apparatus 700 is a separate device from the mobile device, receiver 720 essentially receives measurement signals forwarded by the mobile device. In this case, the measurement signals can be raw measurements such as representations of the timing signals, or processed signals such as a set of range measurements computed by the mobile device from received timing signals. In either case, the receiver outputs a set of N measurements respectively associated with the N reference sources that can be used to determine the position of the mobile device.

Optionally, apparatus 700 can also include a transmitter 730, coupled to antenna 710, for communicating with other devices (e.g., for forwarding measurement data or position information to other devices).

Receiver 720 supplies the set of N measurements to a reliability assessment module 740 which determines the reliability metrics for the individual measurements. For example, reliability assessment module can employ any of a variety of filtering and screening schemes, as described above, to estimate the accuracy or uncertainty associated with each measurement within the set, and provide reliability metrics that can be used to appropriately weight the individual measurements within the N-lateration computations.

Receiver 720 also supplies the set of N measurements to an N-lateration module 750 which determines the position of the mobile device from the measurements by employing one of the iterative algorithms previously described. Reliability assessment module 740 supplies the reliability metrics for the measurements to N-lateration module 750 for use in the N-lateration computations. Upon completing the iterative computation, N-lateration module 750 supplies the mobile device position solution as an output.

While reliability assessment module 740, N-lateration module 750, and receiver 720 are shown as distinct modules in FIG. 7 for descriptiveness, it will be appreciated that the invention is not limited to any particular device architecture or arrangement. For example, reliability assessment module 740, N-lateration module 750, and at least portions of receiver 720 can be implemented with one or more processors, which need not be physically separate or distinct units or processors. Further, the operations and methodologies described herein can be carried out by executing instructions stored on a computer readable medium (i.e., software) on a processor or processors located within apparatus 700. As used herein, the term "computer readable medium" refers to tangible media (e.g., memory or storage devices).

The mobile device can be any readily movable or portable device capable of receiving and, optionally, transmitting signals, including but not limited to: a mobile RF transceiver or receiver, a handheld or body-mounted radio; any type of wireless telephone or handset (e.g., analog cellular, digital cellular, or satellite-based); a pager or beeper device; a navigation device; a PDA; a radio carried on, built into or embedded in a ground-based or airborne vehicle; a satellite-mounted transmitter or receiver; or any other mobile electronic device capable of receiving audio, video, and data information.

The determined position information can be displayed on a display of the mobile device (e.g., on a map or the like) to provide navigation to the user. Further, the position information can be forwarded to a base station or other remote device to inform the system or others of the mobile device's position (e.g., to support E911). Where the position of the mobile device is determined remotely, the position information can be supplied back to the mobile device for display and/or made available to support E911 or other operations within a communication system.

Figure 8:
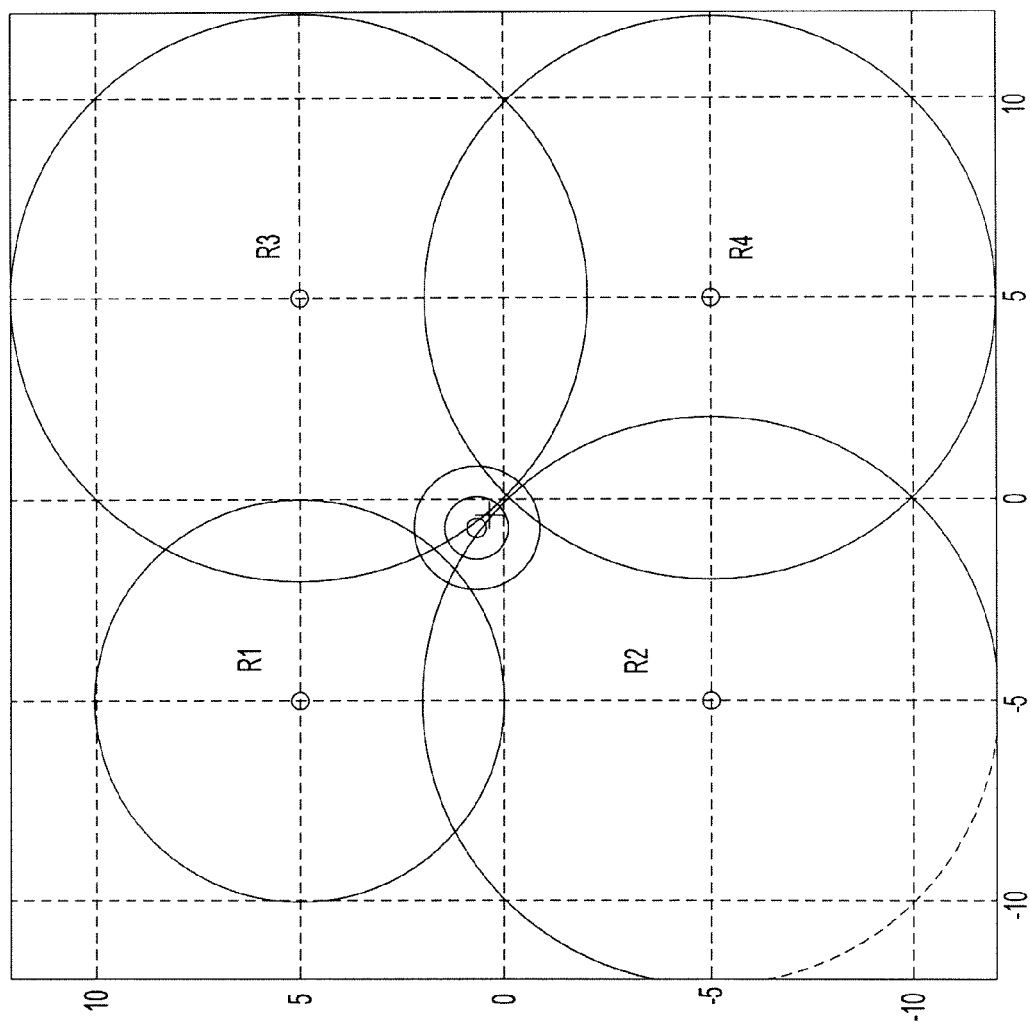
FIG. 8 is a two-dimensional graph illustrating N-lateration with four measurements in which the position solution is determined based on an equal weighting of the measurements.
Figure 9:
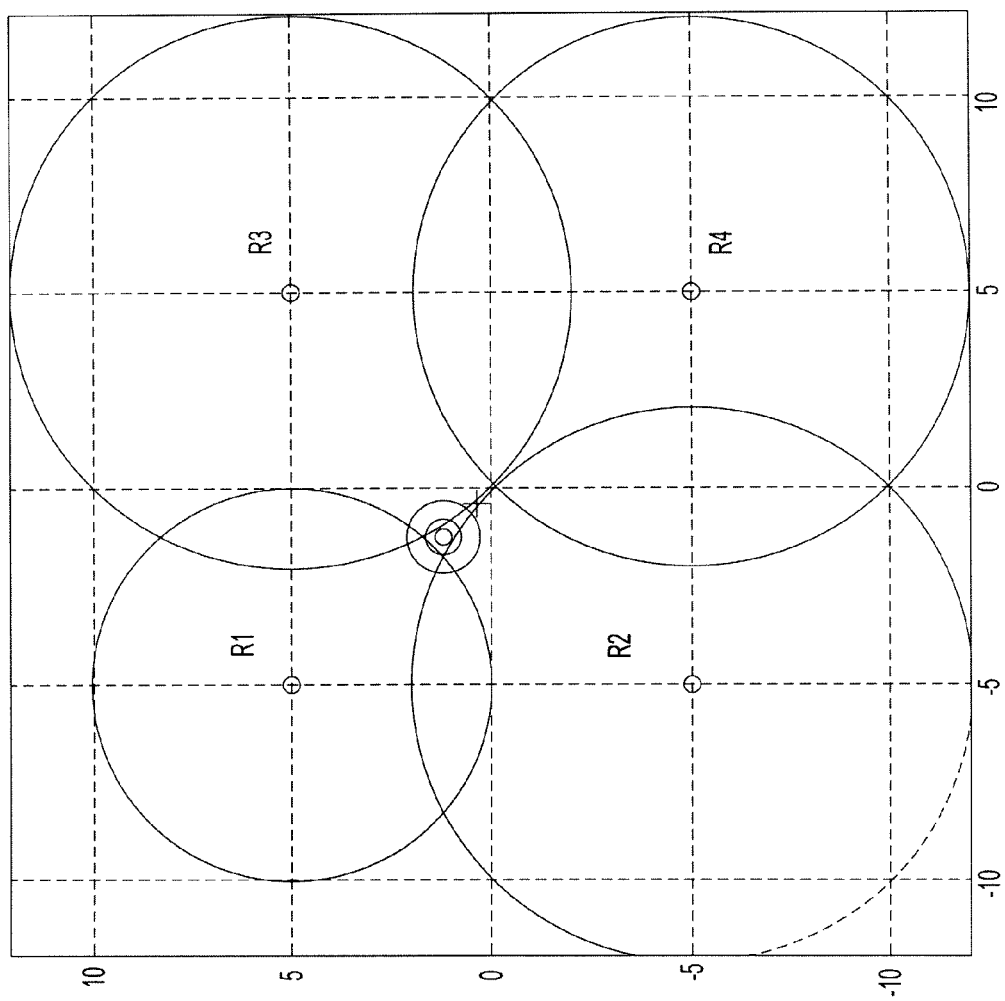
FIG. 9 is a two-dimensional graph illustrating N-lateration with four measurements in which the position solution is determined based on an unequal weighting of the measurements.
Figure 10:
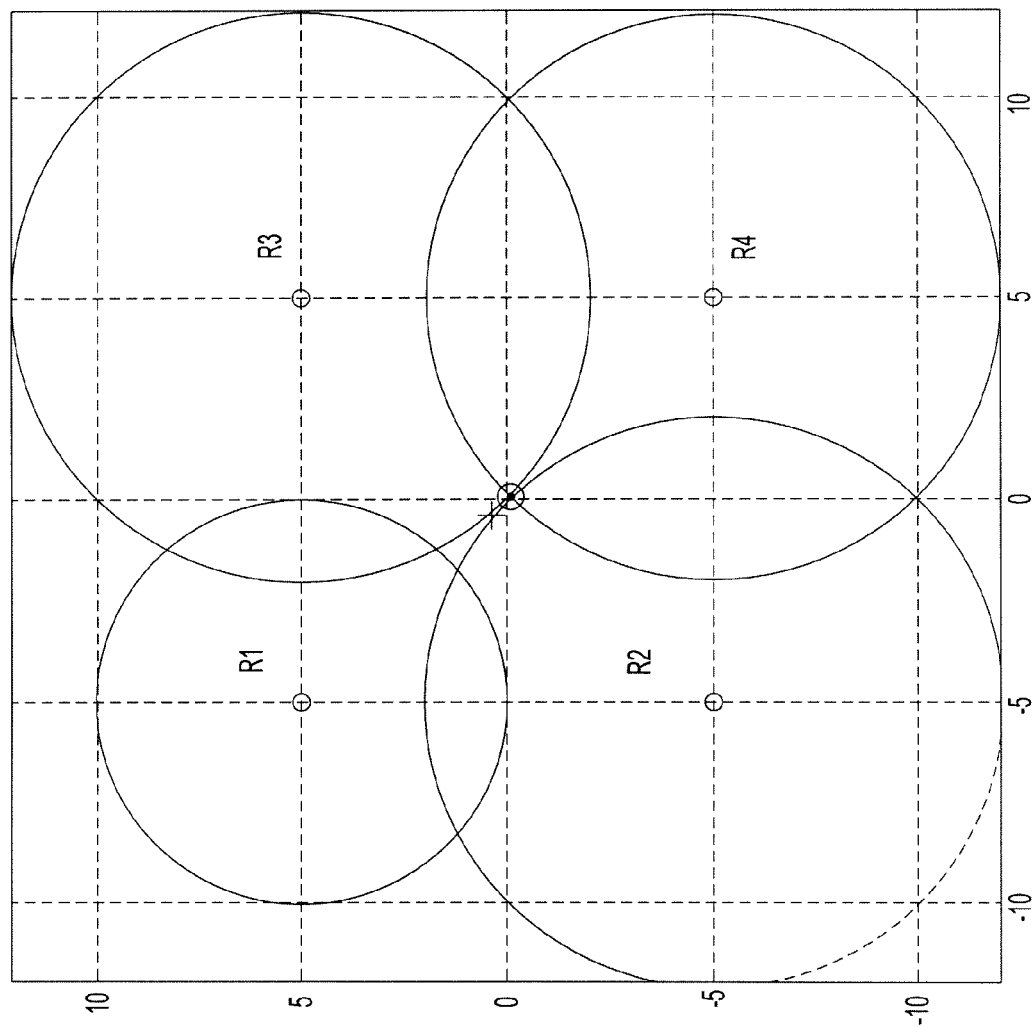
FIG. 10 is a two-dimensional graph illustrating N-lateration with four measurements in which the position solution is determined based on a different unequal weighting of the measurements.

FIGS. 8-10 combine elements of N-lateration, measurement uncertainties, and CEP in an example with four reference nodes. In all three figures the positions of the references nodes are unchanged. However, all reference nodes are considered equally in FIG. 8, while the variances of each node's range data is taken into account in FIGS. 9 and 10. In particular, FIG. 8 shows N-lateration using the least squares method with four reference nodes that are equally weighted with radii as follows: R1=5, R2=7, R3=7, R4=7. The resulting target estimate is (−0.6936, 0.6936) with a CEP of 0.7638. The plus sign in FIG. 8 is the position of initial guess as given by equations (1) to (4).

FIG. 9 shows N-lateration using a weighted least squares method with four reference nodes at the same locations as in FIG. 8. In this case, the variances of all of reference nodes 1, 2, and 3 ($\sigma_1^2$, $\sigma_2^2$, $\sigma_3^2$) are taken to be equal (0.1), and the variance of reference node 4 ($\sigma_4^2$) is increased to 0.7. As seen in the plot, this weighting causes the measurement from reference node 4 to have less influence on the resulting target position estimate, which is (−1.1971, 1.1971), compared with the previous example where all nodes were considered equally. The target estimate has moved away from reference node 4, and the CEP has decreased to 0.4834, indicating a greater degree of confidence in the location, since input from reference node 4 has been discounted relative to the other three.

In FIG. 10, the variance of node 4 ($\sigma_4^2$) is decreased to 0 (indicating 100% certainty in the r4 measurement), while the variances of the other three nodes remain the same as the previous example. As seen in the FIG. 10, this weighting causes the measurement from reference node 4 to have greater influence on the resulting target position estimate compared with the previous example. In particular, the estimated target position moves to a point on the circle of radius r4 (0.0502, −0.0502), since the measurement from reference node 4 is treated as perfectly accurate (certain). The CEP has further decreased to 0.0068, indicating an even greater degree of confidence in the location, since input from reference node 4 has been more heavily weighted relative to the other three. In all of FIGS. 8-10, the two small concentric circles surrounding the target position estimate have radii of 1 and 2 standard deviations respectively.

The N-lateration techniques described herein can be used to provide situation awareness in military exercises in order to determine and track the location of military personnel and/or equipment during coordination of field operations. The position information can be used by a commander to dynamically map the current position of personnel and equipment and to coordinate further movements. Further, individual mobile devices can receive and display position information for other related personnel, so that soldiers in the field are provided with situation awareness for their immediate surroundings.

The technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The technique is also useful in systems used to track high-value items by tagging items or embedding a mobile radio in items such as personal computers, laptop computers, portable electronic devices, luggage (e.g., for location within an airport), briefcases, valuable inventory, and stolen automobiles.

The invention can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park, or tourist attraction; location of personnel within a building; location of prisoners in a detention facility; or to track the movements of parolees. The mobile device can be carried on the body by incorporating the radio into clothing, such as a bracelet, a necklace, a pocket, or the sole of a shoe. The invention can also be applied in systems used in locating the position of mobile telephones, as explained above. This capability could also be used to assist in cell network management (e.g., in cell handoff decisions) and to support the E911 location of mobile telephones for emergency purposes, as previously described.

Having described preferred embodiments of new and improved methods and apparatus for N-lateration with noisy data measurements, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for determining the position of a device, the method comprising:
    receiving at a receiver a set of N measurements from signals transmitted by a respective set of N references devices, where N is an integer greater than two, the N measurements being suitable for determining a position of the device using N-lateration;
    generating, via a processor, respective reliability metrics for the N measurements based on information about uncertainty of individual measurements; and
    iteratively refining, via a processor, an estimate of the position of the device using N-lateration, wherein each iteration includes adjusting the estimate of the position of the device based on a least squares function that is weighted in accordance with the reliability metrics for the N measurements, wherein the least squares function implements Newton's iterative method for minimizing the sum of squares of errors.

2. The method of claim 1, wherein the least squares function further comprises a Hessian matrix of second order partial derivates of the sum of squares of errors.

3. A method for determining the position of a device, the method comprising:
    receiving at a receiver a set of N measurements from signals transmitted by a respective set of N references devices, where N is an integer greater than two, the N measurements being suitable for determining a position of the device using N-lateration;
    generating, via a processor, respective reliability metrics for the N measurements based on information about uncertainty of individual measurements; and
    iteratively refining, via a processor, an estimate of the position of the device using N-lateration, wherein each iteration includes adjusting the estimate of the position of the device based on a least squares function that is weighted in accordance with the reliability metrics for the N measurements, wherein:
    each iteration includes computing an N×1 error vector whose N components are the respective errors between the N measurements and distances between the estimate of the position of the device and the N reference devices; and
    the least squares function comprises an N×N matrix computed from the Jacobian matrix of the error vector, wherein the least squares function implements Newton's iterative method for minimizing the sum of squares of errors.

4. The method of claim 3, wherein the N×N matrix is biased towards steepest decent by weighting mixed partial derivatives less than self partial derivatives of the Jacobian matrix.

5. The method of claim 3, wherein the N×N matrix is computed using a weighting matrix that respectively weights the N components of the error vector in accordance with the reliability metrics for the N measurements.

6. The method of claim 5, wherein diagonal elements of the weighting matrix comprise inverse variances indicating reliabilities associated with respective components of the error vector.

7. The method of claim 5, wherein the method is repeated for successive sets of N measurements, wherein the weighting matrix is adaptive from one set of N measurements to the next based on information about uncertainty of individual measurements.

8. The method of claim 1, wherein the method is repeated for successive sets of N measurements, wherein the reliability metrics are adaptive from one set of N measurements to the next based on information about uncertainty of individual measurements.

9. The method of claim 1, wherein the method is repeated for successive sets of N measurements, wherein the value of N is permitted to vary from one set of measurements to a next set of measurements.

10. The method of claim 1, wherein N is greater than three.

11. A method for determining the position of a device, the method comprising:
    receiving at a receiver a set of N measurements from signals transmitted by a respective set of N references devices, where N is an integer greater than two three, the N measurements being suitable for determining a position of the device using N-lateration; and
    iteratively refining, via a processor, an estimate of the position of the device using N-lateration, wherein each iteration includes adjusting the estimate of the position of the device based on a least squares function,
    wherein each iteration includes computing an N×1 error vector whose N elements are the respective errors between the N measurements and distances between the estimate of the position of the device and the N reference devices, and wherein the least squares function comprises an N×N matrix computed from the Jacobian matrix of the error vector, the least squares function implementing Newton's iterative method for minimizing the sum of squares of errors.

12. An apparatus for determining the position of a mobile device, the apparatus comprising:
    a receiver configured to generate a set of N measurements based on signals transmitted by a respective set of N references devices, where N is an integer greater than two, the N measurements being suitable for determining a position of the mobile device using N-lateration;

a reliability assessment module configured to generate respective reliability metrics for the N measurements based on information about uncertainty of individual measurements; and an N-lateration module configured to iteratively refine an estimate of the position of the mobile device using N-lateration, wherein the N-lateration module iteratively adjusts the estimate of the position of the mobile device based on a least squares function that implements Newton's iterative method for minimizing the sum of squares of errors, and wherein the N-lateration module weights the least squares function in accordance with the reliability metrics for the N measurements.

13. The apparatus of claim 12, wherein:

for each iteration, the N-lateration module computes an N×1 error vector whose N components are the respective errors between the N measurements and distances between the estimate of the position of the device and the N reference sources; and the least squares function comprises an N×N matrix computed from the Jacobian matrix of the error vector.

14. The apparatus of claim 13, wherein the N×N matrix is biased towards steepest decent by weighting mixed partial derivatives less than self partial derivatives of the Jacobian matrix.

15. The apparatus of claim 13, wherein the N-lateration module computes the N×N matrix using a weighting matrix that respectively weights the N components of the error vector in accordance with the reliability metrics for the N measurements.

16. The apparatus of claim 15, wherein diagonal elements of the weighting matrix comprise inverse variances indicating reliabilities associated with respective components of the error vector.

17. The apparatus of claim 12, wherein the N-lateration module repeatedly uses N-lateration to determine the position of the mobile device from successive sets of N measurements, wherein the reliability metrics are adaptive from one set of N measurements to the next based on information about uncertainty of individual measurements.

18. The apparatus of claim 12, wherein the N-lateration module repeatedly uses N-lateration to determine the position of the mobile device from successive sets of N measurements, wherein the value of N is permitted to vary from one set of measurements to a next set of measurements.

19. The apparatus of claim 12, wherein the apparatus comprises at least a portion of the mobile device.

20. The apparatus of claim 12, wherein the apparatus is a separate device from the mobile device.

21. A computer readable medium storing instructions, that when executed by a computer, cause the computer to perform functions of:

generating a set of N measurements from signals transmitted by a respective set of N references devices, where N is an integer greater than two, the N measurements being suitable for determining a position of the device using N-lateration;

generating respective reliability metrics for the N measurements based on information about uncertainty of individual measurements; and iteratively refining an estimate of the position of the device using N-lateration, wherein each iteration includes adjusting the estimate of the position of the device based on a least squares function that minimizes a sum of squares of errors that implements Newton's iterative method for minimizing the sum of squares of errors, wherein the least squares function is weighted in accordance with the reliability metrics for the N measurements.

22. The method of claim 1, wherein the least squares function minimizes a sum of squares of errors between the N measurements and distances between the estimate of the position of the device and the N reference devices.

23. The method of claim 3, wherein the least squares function minimizes a sum of squares of errors between the N measurements and distances between the estimate of the position of the device and the N reference devices.

24. The method of claim 11, wherein the least squares function minimizes a sum of squares of errors between the N measurements and distances between the estimate of the position of the device and the N reference devices.

25. The apparatus of claim 12, wherein the least squares function minimizes a sum of squares of errors between the N measurements and distances between the estimate of the position of the device and the N reference devices.

26. The apparatus of claim 12, wherein the least squares function further comprises a Hessian matrix of second order partial derivates of the sum of squares of errors.

27. The computer readable medium of claim 21, wherein the least squares function minimizes a sum of squares of errors between the N measurements and distances between the estimate of the position of the device and the N reference devices.

28. The computer readable medium of claim 21, wherein the least squares function further comprises a Hessian matrix of second order partial derivates of the sum of squares of errors.

29. The computer readable medium of claim 21, wherein:

each iteration includes computing an N×1 error vector whose N components are the respective errors between the N measurements and distances between the estimate of the position of the device and the N reference devices; and the least squares function comprises an N×N matrix computed from the Jacobian matrix of the error vector.

* * * * *

UNITED STATES PATENT AND TRADEMARK OFFICE
CERTIFICATE OF CORRECTION

| | | |
|---|---|---|
| PATENT NO. | : 8,149,162 B1 | Page 1 of 1 |
| APPLICATION NO. | : 12/577447 | |
| DATED | : April 3, 2012 | |
| INVENTOR(S) | : Richard J. Pauls | |

It is certified that error appears in the above-identified patent and that said Letters Patent is hereby corrected as shown below:

Column 10, line 4, replace "perfoiined to refine" with -- performed to refine --

Signed and Sealed this
Nineteenth Day of June, 2012

David J. Kappos
*Director of the United States Patent and Trademark Office*